Nov. 8, 1960  KAZUO SAYANAGI  2,959,105
PHASE NOISE FILTER AND ITS APPLICATION TO
PHOTOGRAPHY AND PHOTOLITHOGRAPHY
Filed July 24, 1958  2 Sheets-Sheet 1

Ordinat in pupil

INVENTOR.
KAZUO SAYANAGI
BY
ATTORNEY

2,959,105

PHASE NOISE FILTER AND ITS APPLICATION TO PHOTOGRAPHY AND PHOTOLITHOGRAPHY

Kazuo Sayanagi, Kohokuku, Yokohama City, Japan, assignor to Canon Camera Company, Inc., Tokyo, Japan, a corporation of Japan Filed July 24, 1958, Ser. No. 750,815

2 Claims. (Cl. 88—106)

This invention relates to optical filters to produce any desired variation in imaging characteristics when cooperatively combined with another imaging lens.

An object of this invention is to obtain a soft focus filter without any light loss and to produce a favorable soft focus effect when combined with an ordinary photographic lens.

Another object is to obtain a soft focus filter to be attached to a very sharp photographic objective lens so as to produce a good, soft tone, portrait.

A further object is to obtain a very effective filtering, or cut-off, device to produce a continuous tone image from any optical images of periodic structures such as screen dots or of line structures in television images, etc. even under incoherent illumination thereof. The process of the present invention is a filtering process much more practical than any conventional process utilizing coherent illumination.

Another object is to produce a smooth, non grainy picture from photographic plates of grainy structure by using a filter according to this invention.

A further object is to obtain a filter to eliminate the moire appearance produced in rescreening in photoengraving. The process according to the present invention has a very high reproducibility and is easier to use, and, moreover, the cost thereof is lower than any conventional process.

A clear concept of the scope and purpose of this invention may be obtained from the following description, taken in connection with the attached drawing, in which.

The characteristics of an imaging lens may be represented by the response function or the contrast transfer function, the response function being expressable by the autocorrelation function of the pupil function represented by rectangular coordinates $(x, y)$ of the lens, assuming the intersecting point of the pupil and the principal ray as its origin. That is to say, if we denote the wave front aberration by $W(x, y)$, the response function $R(s, t)$ is as follows, $$R(s, t) = \frac{1}{\pi} \int\!\!\int_{-\infty}^{\infty} f\left(x+\frac{s}{2}, y+\frac{t}{2}\right) f^*\left(x-\frac{s}{2}, y-\frac{t}{2}\right) dx dy \quad (1)$$

wherein $$f(x, y) = \exp\{-ikW(x, y)\} \quad (2)$$

and $f^*$ denotes the conjugate complex of the function $f$. Let the F number of the lens be F and the wave length of the ray be $\lambda$, the amount $(s, t)$ representing the above spatial frequency will have the following relation with the spatial frequency $(\nu, \omega)$ (line/mm.):

$$S = 2.F.\lambda.\nu, \quad t = 2.F.\lambda.\omega$$

Figure 1:
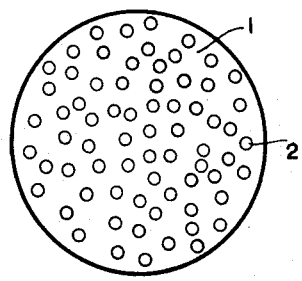
Figure 1 is a plan view of the filter according to the present invention.
Figure 2:
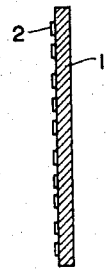
Figure 2 is a sectional view of the filter along its optical axis.
Figure 3:
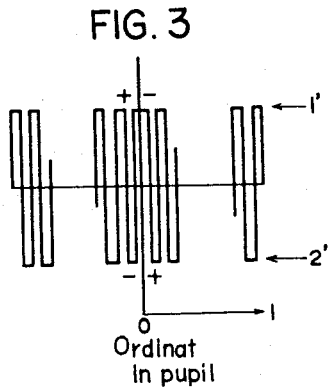
Figure 3 shows a diagram of pupil function of a combination of the filter according to the present invention with an imaging lens.

Assuming that a phase disturbance, caused by the filter illustrated in Figures 1 and 2, is given as a wave front aberration. In the drawings many small spots 2 of transparent thin film or layer which result in an optical transmission difference of $\delta$ comparable with the wave length $\lambda$, are disposed on a transparent support 1. The thickness, shape, size, and/or distribution of the layer are at random as the electronic wave form in electronic noise. Figure 3 shows the pupil function of such wave front aberration when $\delta = \lambda/2$, and the size and distribution of the spots of the layer are at random. In the drawing, that portion of the filter having no spots or layers thereon is referenced 1, while the filter portion to which the spots or layers are attached is referenced 2.

Figure 4:
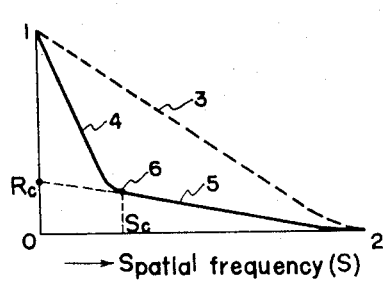
Figure 4 shows a diagram of autocorrelation function of the pupil function shown in Figure 3, and it represents also a response function showing the imaging characteristics of the combined optical system of the filter and the lens.

From the calculation of the autocorrelation function of such random figure, an imaging characteristic, as shown in Figure 4, is obtained. In the graph, the value of the response function is 1 when the spatial frequency S is zero, and the graph of the response function consists of a quickly decreasing portion 4, a bending point 6 and a gradually decreasing portion 5. The quickly decreasing portion 4 corresponds to the correlated width random fluctuation, and the value of the bending point corresponds approximately to the residual correlation. In the noise theory of electronics, correlation width is considered as the mean periodicity of noise, and residual correlation as the square of the mean value (D.C. current component). The curve 3 represents the response function of an aberration-free lens.

The coordinates $R_c$ and $S_c$ of the bending point 6 are then given, using Equation 2 and geometrical consideration in the case shown in Figure 3, for arbitrary values of $\delta$, by $$Rc = [a + p \exp\{-ik\delta\}]^2 \quad (3)$$

$$Sc \doteq \varphi/(f\lambda) \quad (4)$$

wherein $a$ denotes the fractional portion of the total area of the filter portion without spots or layers and $p$ that of the portion having spots or layers, that is $a + p = 1$; $\varphi$ the mean diameter of the layer spots; $f$ the focal length of the imaging lens to be cooperatively associated with the filter, and $\lambda$ the wave length of the ray.

By properly selecting $a$, $p$, $\delta$, $\varphi$ and $f$, the values of $Rc$ and $Sc$ can be varied and, therefore, any imaging characteristic can be obtained. The above consideration is in respect of aberration-free lenses but is equally applicable also in respect of actual lenses so that any actual lens may be treated in the same way.

Optical filters as described above are called "phase noise filters." In the transparent phase noise filter only the imaging characteristic is varied, but no loss in the amount of light is involved. Such optical filters are produced by vacuum evaporation from non-metals, such as magnesium monoxide, on a transparent support, such as glass plate, polyvinyl alcohol, etc. In such construction, we can arbitrarily select $a$, $p$, $\delta$, $\gamma$ and $f$, and obtain random spot shapes and distribution, using suitable masks of thin metal or by using the photo-resist method.

A most important feature of the present invention is that a filter of any desired characteristics can be freely designed.

To obtain a soft tone photograph of an object, such as a portrait, there are soft focus lenses or soft focus filters. As they are lenses for specific use, they have the defect that they are not suitable for general purposes or they involve losses in the amount of light. However, when the filter of the present invention is used, a favorable soft focus effect can be obtained by merely associating the filter as a simple attachment to a sharp lens.

Figure 5:
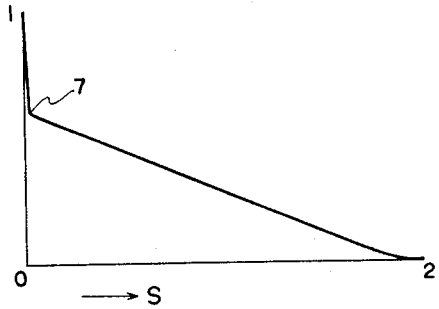
Figure 5 shows a diagram of a response function giving a soft focus effect adapted to portrait photographing.

The soft focus effect can be realized by a filter to produce an image of a point as an image with a core in it and halo at its peripheral region. From the view point of response function, a drop in gain at a very low spatial frequency domain, as in Figure 5, and a residual gain in the high frequency domain for the sharp core, are necessary. For example, in a phase noise filter designed for use with a lens of 100 mm. focal length in a 35 mm. roll film camera, favorable results will be obtained by making $\varphi \leq 0.1$ mm. and $0.2 < p < 0.4$ for the case of $\delta = \gamma/2$. Many other combinations of $a$, $p$ and $\delta$ are possible for this purpose.

Figure 6:
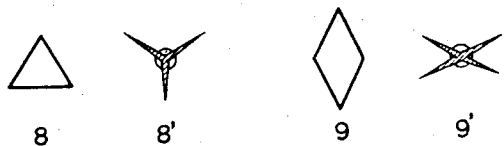
Figure 6 shows shapes of thin coating to be formed on the filter surface and intensity distributions of point images when they are used.

If the shape of the layer spot is of the configuration of an equilateral triangle 8 or of a rhombus 9 in Figure 6, the intensity distributions of the point image will be 8' and 9', respectively. Such intensity distribution is determined as one of the diffraction patterns of a lens which has the same diagram. But, in the instant case, the existance of the core for the sharp image is the characteristic feature. Any other shapes can be used for the spots, according to the purpose.

Figure 7:
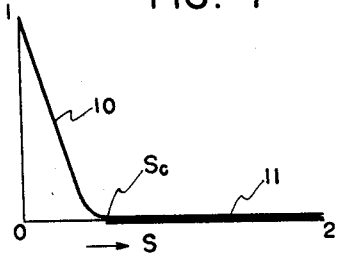
Figure 7 shows a diagram of response function adapted to cut off periodic structures.

If $a$, $p$ and $\delta$ in Formula 3 are of such values that Rc is zero, then the response function will be as shown in Figure 7 and the spatial frequencies higher than Sc will be completely cut off. Such characteristic is obtained when $a = p = 0.5$ and $\delta = \gamma/2$, using Equation 3. For example, if $\gamma = 500$ m$\mu$, $Sc = 10$ lines per mm. and $f = 200$ mm., then $$\Delta = \frac{\delta}{(n-1)} = 0.65$$

$$\varphi = f \lambda Sc = 1 \text{ mm.}$$

The same cut off characteristic can be realized by stopping down the aperture of the imaging lens to a diameter of $\phi$. The image will, however, be too dark to be photographed. It is also one of the features of the present invention to obtain an aperture stopped down effect while maintaining the image as bright as for larger apertures. The characteristic shown in Figure 7 is suitable to obtain a continuous tone image by filtering the periodic structure accompanied by screen dots, television image or by telephotograph. Because of the higher frequency component, Sc is not transmitted by the optical filter of this invention if the frequency of the periodic structure is the same as, or slightly larger than, Sc.

Figure 8:
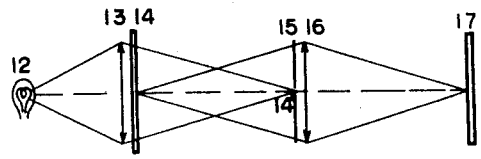
Figure 8 shows a filtering device used under coherent illumination.
Figure 9:
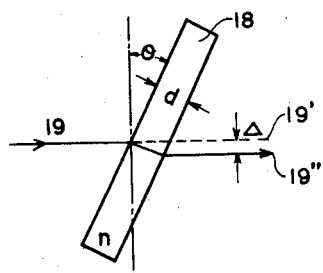
Figure 9 is a view showing inclination of a parallel planed glass plate to the optical axis and displacement of light beam.

In filtering with such periodic structures, a filtering method wherein an object 14 to be photographed is coherently illuminated by a light source 12 and a condenser lens 13, and with an aperture stop 15 positioned at its diffraction pattern 14', has been priorly employed. In Figure 8, 16 denotes an imaging lens and 17 denotes an image plane. There are many difficulties, such as, the object to be photographed should be a transparent image, the supporter of the image must be optically flat and homogeneous, and the size of the object which can be coherently illuminated is actually limited. It is one of the remarkable features of the present phase noise filter that the identical effect as described above, can likewise be easily attained under incoherent illumination. In fact, this is obtained just by attaching a filter of the present invention, and having a proper value of $\phi$ of the objective lens, and making an exposure as usual.

The grainy structure of a photographic plate will impart an unpleasant impression to its observers when the original plate is enlarged to a high magnification. Such unpleasant impression can be remedied by utilizing the filtering characteristics of the phase noise filter according to the present invention.

Moire appears in rescreening an original composed of screen dots or in rescreening a telephotographic image.

Such moire has been eliminated by utilizing the methods in which either the relative angle of the screen to the original picture is varied, or the imaging lens is defocused, or employing a ground glass, or a parallel planed glass plate is oscillated in front of the imaging lens. These methods have such poor reproducibility that considerable skill is required to practice them. An improved apparatus in which a parallel-planed glass plate is vibrated and precisely driven by a motor to obtain high reproducibility, has been introduced on the market. This apparatus, however, is so large and, in operation, accompanied with so much mechanical oscillation that it can not be attached to a small camera of usual size, and, in addition, still requires skill in using it.

Assuming the refractive index of the parallel-planed glass plate to be $n$, and its thickness $d$, when the glass plate is inclined at an angle $\theta$ with respect to the optical axis of the objective, the displacement $\Delta$ of the optical path will be given by $$\Delta = \frac{\sin \theta (\sqrt{n^2 - \sin^2 \theta} - \cos \theta)}{\sqrt{n^2 - \sin^2 \theta}} \cdot d \quad (5)$$

$$\doteq \theta \frac{n-1}{n} \cdot d \text{ for small values of } \theta \quad (5')$$

When the cylindrical intensity distribution of a point image is formed by such vibrating glass plate method, the response function is given by $$R'(s) = \frac{2 J_1(cs)}{cs} \quad (6)$$

wherein $c$ is a constant, and $J_1(cs)$ is the Bessel function of the first kind.

Figure 10:
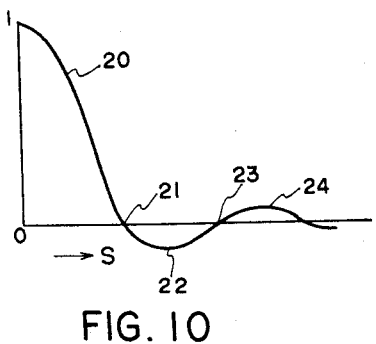
Figure 10 shows the graph of the response function in which any frequency higher than a certain frequency is cut off in the image plane by vibrating a parallel planed glass plate or by rotating such glass around the optical axis of the system.

In this case, it has no perfect cut-off as shown in Figure 10.

A rapidly decreasing portion 20 and a first cut-off portion 21 are followed by a further transverse resolution region 22, the second cut-off portion 23, and a super resolution region 24, etc. Therefore, as a cut-off device for periodic structures, the glass vibrating device is inferior to the phase noise filter of the present invention, as readily follows from a comparison of the graphs of Figures 7 and 10.

Figure 11:
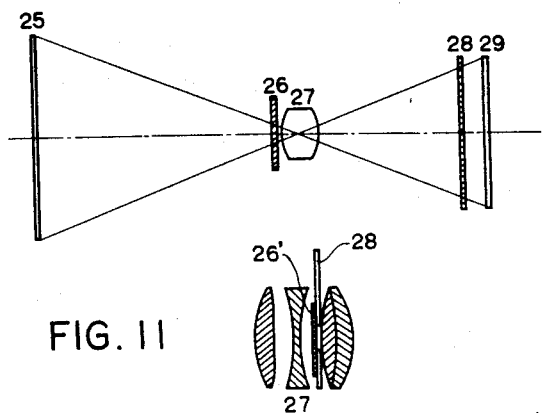
Figure 11 shows the arrangement of each element in the device to eliminate moire in a rescreening process.

In order to prevent moire by using the filter according to the present invention, an original 25 is photographed by merely attaching the phase noise filter 26 to the objective lens included in a usual screening device comprising an imaging lens 27, a screen 28 and a photosensitive material 29, therefore, no other operation being required. In such case, instead of attaching the filter in front of the lens, a phase noise filter 26', made of a thin supporter, may be provided over the structure of the iris included in imaging lens 27' as shown in Fig. 11.

The proper value for $\varphi$ to prevent moire is given by $$\varphi = \frac{\lambda}{25.4} \cdot k . L . f . \left(1 + \frac{1}{m}\right) \quad (7)$$

wherein $k$ is a constant between 2 and 2.8, L the number of lines per inch of the screen, $f$ the focal length of the lens in millimeters, and $m$ the image magnification.

What I claim is:

1. An optical filter for use with an imaging lens comprising a transparent support and a plurality of discrete mutually spaced spots of transparent film on at least one surface of the support, each spot being of a thickness of the order of the wavelength of the light passing through the filter and lens, a desired shape, and of a material of a predetermined density, and the spots of the plurality have a random distribution.

2. The optical filter according to claim 1 in which the ratio of the area of the transparent support covered by the spots to the portion of support area free of spots is unity, and the thickness of the spots is such that the length of the transmission path of light through spot-covered regions of the support is a half wavelength of the light longer than through the support free of spots.

References Cited in the file of this patent

UNITED STATES PATENTS 1,627,892   Frederick _____ May 10, 1927

FOREIGN PATENTS 1,021,241   France _____ Nov. 26, 1952